United States Patent [19]
Chaffee

[11] Patent Number: 5,253,261
[45] Date of Patent: Oct. 12, 1993

[54] GAS LASER SOLENOID AND COOLING APPARATUS

[75] Inventor: Edwin G. Chaffee, Salt Lake City, Utah

[73] Assignee: American Laser Corporation, Salt Lake City, Utah

[21] Appl. No.: 945,385

[22] Filed: Sep. 16, 1992

Related U.S. Application Data

[63] Continuation-in-part of Ser. No. 871,925, Apr. 21, 1992, abandoned.

[51] Int. Cl.⁵ .............................................. H01S 3/04
[52] U.S. Cl. ...................................... 372/34; 372/37; 372/61
[58] Field of Search .................... 372/37, 34, 92, 61

[56] References Cited

U.S. PATENT DOCUMENTS 4,715,039 12/1987 Miller et al. .................... 372/37

Primary Examiner—Léon Scott, Jr.
Attorney, Agent, or Firm—Olive & Olive

[57] ABSTRACT

A high temperature laser solenoid incorporates a combination of thermally and electrically insulating components to replace and to exceed the operating limits of epoxy encapsulation which solenoid is used in cooperation with a mechanically driven cooling air flow. The solenoid construction includes a layer of high temperature resistant, electrical insulation assembled on an aluminum bobbin adapted for coil winding so as to create a solenoid. High temperature insulated magnet wire is wound into a coil on the bobbin and the coil is covered with an additional high temperature resistant, electrically insulating film layer. Wire leads are passed through notches formed through the insulation barrier and the bobbin flanges and the solenoid is covered by an intimately contacting preformed heat conductive tubular casing. Forced draft cooling is supplied to the laser assembly, and particularly to the solenoids, by a positive pressure input ventilator and a negative pressure suction fan to maintain a controlled thermal environment. The solenoid is preferably associated with a single piece laser tube for increased laser life.

8 Claims, 3 Drawing Sheets

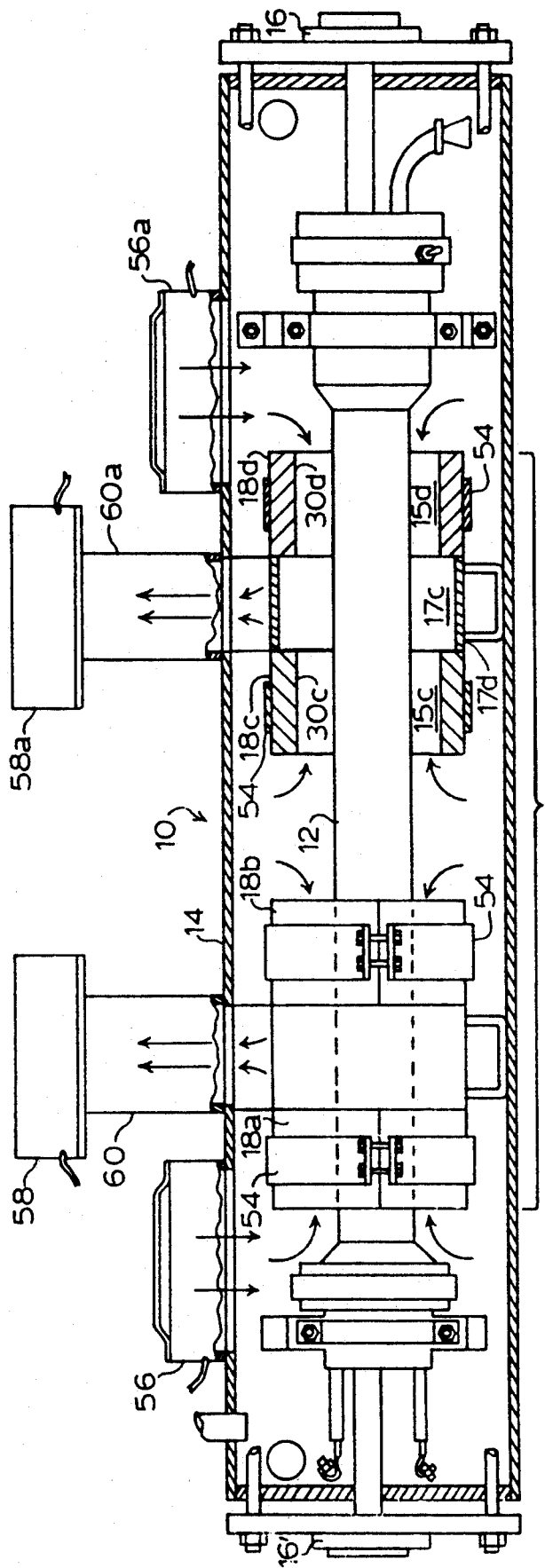
FIG. 1
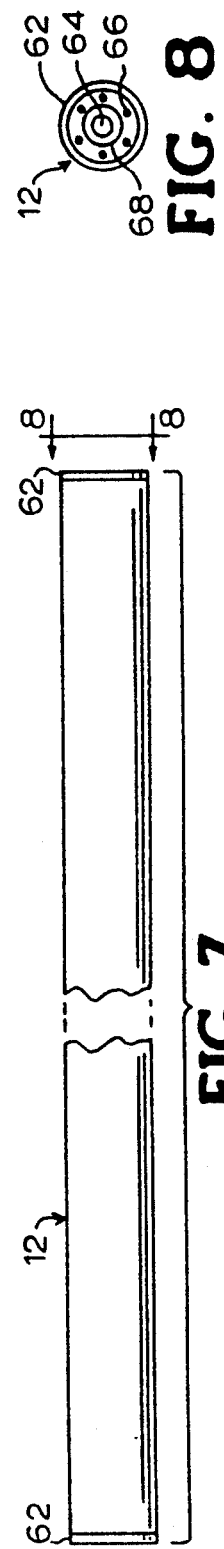
FIG. 7
FIG. 8

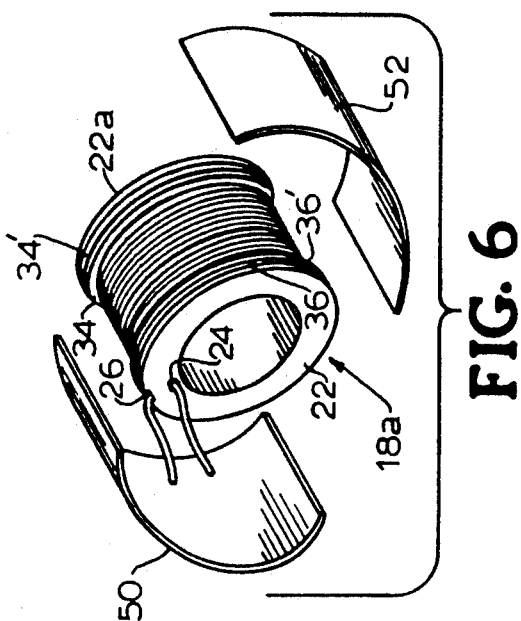
FIG. 6
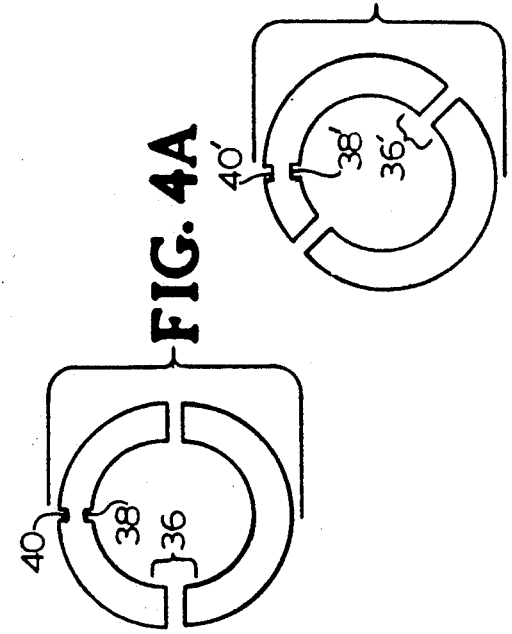
FIG. 4A
FIG. 4B

GAS LASER SOLENOID AND COOLING APPARATUS

RELATED APPLICATION

This application is a continuation-in-part of application Ser. No. 07/871,925 filed on Apr. 21, 1992 for GAS LASER EXCITATION SOLENOID, now abandoned.

FIELD OF THE INVENTION

The present invention relates to the field of lasers, and, more particularly to the construction of electrically energized solenoids and cooling apparatus of the type used with gas lasers.

BACKGROUND OF THE INVENTION

In the operation of a gas laser such as, for example, an argon or krypton gas laser, it is common to utilize an electrically induced magnetic field to increase the beam density in the active medium for more efficient excitation. An elongate electromagnetic solenoid, optionally assembled from a series of shorter solenoids, connected to a power source surrounds the laser tube and is used for this purpose. During operation of the solenoid, the electric current passing through the solenoid will generate a significant amount of heat which contributes to the overall heat generated by other components of the laser and which, in the vicinity of the solenoid, may get as high as 250° C.

One known approach to correct for the heat build up in and around a gas laser tube and any solenoid component is to add means for artificial cooling, utilizing either air or water circulation. Such cooling means is of some help, but has a limitation in the amount of heat that can be removed.

The solenoid itself has typically been constructed with an epoxy resin encapsulation to physically and electrically protect the windings of the coil. This epoxy resin has fairly good electrical insulation properties, good mechanical properties, and moderate thermal tolerance. However, epoxy encapsulating resin, when fully cured, only has a temperature resistance of up to 130° C. Beyond this temperature, the epoxy resin will break down, melt and burn, thereby degrading and destroying its electrically insulative and mechanically protective value. Since hot air surrounding the tube or flowing in an air cooling system may exceed 130° C. in temperature, the epoxy resin tends to degrade when exposed to such extremely hot air, subjecting the solenoid to electrical failure.

Therefore, an objective of the present invention is to provide a gas laser solenoid which will withstand a high temperature environment.

An additional objective of the invention is to provide a gas laser solenoid capable of operating at a higher temperature than that which will degrade cured epoxy resin.

A further objective of the invention is to provide a improved cooling means for a solenoid in a gas laser.

These and further objectives will become apparent to those skilled in the art from the description which follows.

SUMMARY OF THE INVENTION

The invention disclosed provides a high temperature tolerant gas laser excitation solenoid in a laser construction incorporating forced draft cooling. A layer of high temperature resistant electrical insulation is placed between the flanges and around the core of a metal formed bobbin onto which appropriately insulated magnet wire is to be wound. Sets of split washers formed of high temperature resistant, electrically insulating material are placed adjacent each flange of the bobbin and the magnet wire is wound onto the bobbin. After the winding is completed, the resulting coil is covered with another layer of high temperature resistant electrical insulation. The completed coil is encased in a highly thermally conductive tubular casing formed from half sections which are strapped together and anchored within the laser head. The laser tube is passed through the bobbin core with a resulting air channel therebetween, following which electrical power connections are made to the solenoid to complete its installation. One or more sets of input ventilation and suction fans are mounted to the laser housing so as to create a cooling air flow through the solenoids and out of the housing. In a preferred form, the improved solenoid and cooling system of the invention are operatively associated with a gas laser having a single piece laser tube rather than the conventional segmented laser tube. The term "tube" for purposes of the present description, refers to the central section of the laser which contains and guides the plasma during discharge and defines the active region in which light generation is achieved. An example of one type of segmented tube can be seen in U.S. Pat. Nos. 4,380,077 or 4,553,241.

BRIEF DESCRIPTION OF THE DRAWINGS

FIG. 1 is a side elevation sectional view of a laser tube having several solenoids and cooling devices installed and made according to the invention with a partial section taken through a pair of solenoids for clarity of detail.

FIG. 4A is an end elevation view of one split washer of FIG. 4 used in the solenoid of the invention.

FIG. 4B is an end elevation view of another split washer used in the solenoid of the invention.

FIG. 6 is a perspective view of the wound solenoid with tubular half casings positioned to be assembled thereto.

FIG. 7 is a side elevation view of the preferred form of single piece laser tube for use with improved solenoid and cooling system of the invention.

FIG. 8 is an end elevation view of the FIG. 7 tube taken in the direction of line 8—8 of FIG. 7.

DESCRIPTION OF THE PREFERRED EMBODIMENT

Figure 3:
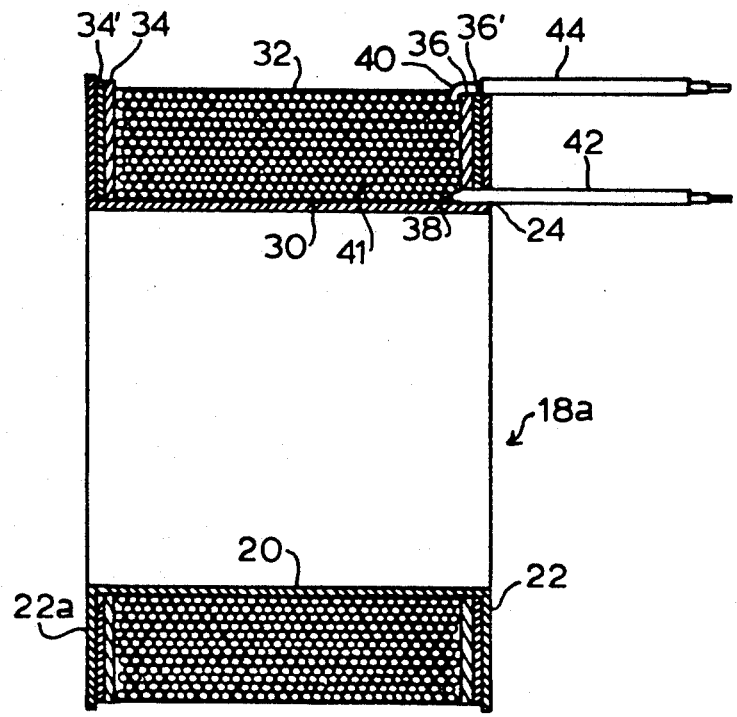
FIG. 3 is a section view of the bobbin of FIG. 2 taken along line 3—3 of FIG. 2.

A gas laser 10 according to the invention and illustrated in FIG. 1 includes at opposite anode and cathode ends of the single piece laser tube 12 respective high reflectance and partially transmitting mirrors 16, 16' positioned to respectively reflect and partially transmit a portion of the laser beam in a manner well known in the art. Since the invention is primarily directed to the cooling means and the construction of solenoids which surround the laser tube 12 as a means for exciting the gas in the laser tube 12, the tube mounting, power supply and similar details of construction not related to the invention are not shown or described. The drawings and description are thus directed primarily to an improved solenoid construction and cooling which is the essence of the invention. Attention is also given to the construction and use of the single piece tube 12 in contrast to the more conventional segmented type of laser tube.

The improved solenoid assembly 18 of the invention is illustrated as being made up of a plurality of electrically connected, individual solenoids 18a, 18b, 18c and 18d and spaced lengthwise of laser tube 12 as illustrated in FIG. 1 in order to permit air circulation. The general flow of air is depicted in FIG. 1 by arrows entering each end of each section of the solenoid assembly and exiting the central portions thereof via connected duct work.

In order to control and ensure adequate cooling in the invention, a mechanism to positively drive an air stream is provided. Input ventilators 56 and 56a are mounted on, and in fluid communication with, laser housing 14. Input ventilator 56 causes a flow of cooling air to enter laser 10 near the left extremity of solenoid assembly 18a, 18b, generating a positive pressure throughout the cavity enclosed by laser housing 14. A similar arrangement exists with input ventilator 56a at the right end of solenoid assembly 18c, 18d. As is illustrated in the partial sectional view of solenoids 18c, 18d, the inner diameter of coils 30c, 30d, which are mounted in a position concentric with and surrounding laser tube 12, is significantly larger than the outer diameter of laser tube 12 so as to establish air channels 15c, 15d. Air channels 15c, 15d are further in fluid communication with an air chamber 17c created by circumferential band 17d to which air duct 60a is directly connected. Air ducts 60, 60a are assembled in fluid communication with the air chamber 17c between solenoid coils 18c, 18d. Suction fans 58, 58a are fixedly connected to the outer ends of air ducts 60, 60a respectively. The composite result of this arrangement in terms of air flow is that input ventilators 56, 56a force air into the laser assembly to flow through solenoids 18a, 18b, 18c, 18d and, simultaneously, suction fans 58, 58a draw the heated air out through air ducts 60, 60a. This combination pressure/suction air flow arrangement generates an adequate flow of air to remove the excess heat from solenoids 18. Input ventilators 56, 56a and suction fans 58, 58a may be any conveniently mountable driven air-moving device and preferably comprise electrically driven fans.

Figure 2:
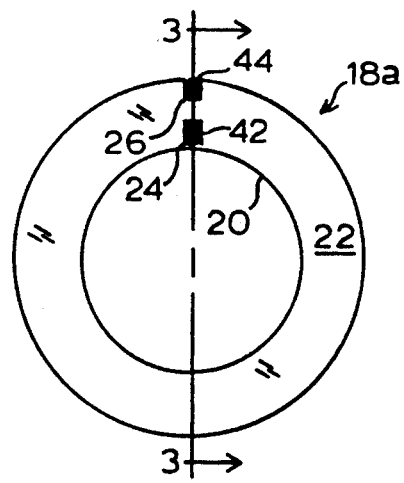
FIG. 2 is an end elevation view of a solenoid bobbin wound with magnet wire according to the invention.
Figure 5:
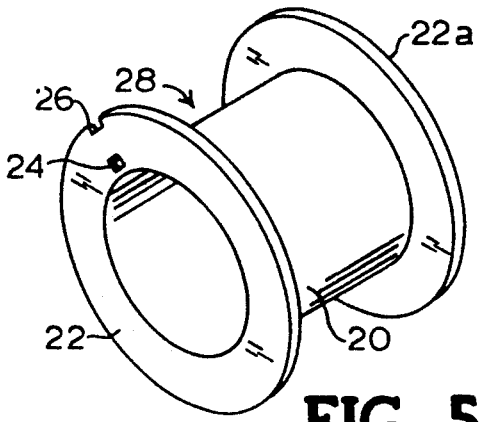
FIG. 5 is a perspective view of an empty bobbin of the type used in the solenoid of the invention.

The general form of representative solenoid 18a of the invention, prior to being encased, is shown in FIGS. 2 and 3 in end and side sectional elevation respectively. Solenoid 18a is based on use of a bobbin 28 (FIG. 5) formed with a round tubular core 20 and at opposite ends of core 20, a pair of planar, annular flanges 22, 22a formed integral with core 20 and oriented perpendicular to the axis of core 20. Bobbin 28 is preferred to be made entirely of a heat conductive, heat tolerant, material which is capable of affording physical protection to the later described winding on core 20, aluminum being a preferred bobbin 28 material. Flange 22 of bobbin 28 is formed with an inner hole 24 and an outer notch 26 respectively located proximate inner and outer edges of flange 22 in radial alignment with one another. The bobbin inner hole 24 enables the beginning lead 42 of solenoid 18a to pass through flange 22 to enable an electrical connection to be made thereto and to avoid damage to lead 42 as the wire coil forming solenoid 18a is being wound. The bobbin outer notch 26 allows the positioning of coil ending lead 44 to reside within the periphery of flange 22 to permit assembly of outer protective half-section tubular casings 50, 52 (FIG. 6) snugly around the completed solenoid 18a as will become apparent from later description.

Further details of the configuration of solenoid 18a are illustrated in FIG. 3 in cross-sectional view. Prior to the commencement of winding the magnet wire 41 around core 20, a wrap layer of high temperature resistant electrical and thermal insulation in the form of a thin film which is capable of withstanding at least 200° C., such as Kevlar ® (DuPont Co., Inc., Wilmington, Del.) polyamide film, is layered around core 20, fully covering core 20 between flange 22 and flange 22a. Next, a set of high temperature resistant, electrically and thermally insulating split washers 34, 34' (of the type shown in FIGS. 4A, 4B) are mounted adjacent to the inner surface of flange 22a and a set of split washers 36, 36' are mounted adjacent to the inner surface of flange 22.

Figure 4:
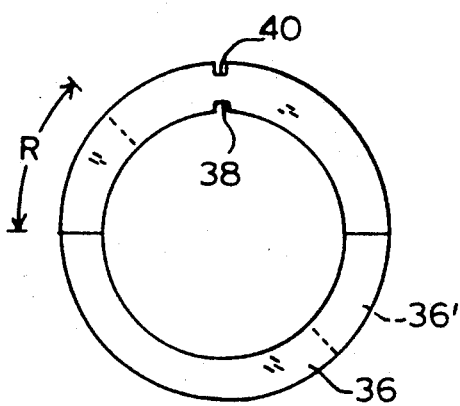
FIG. 4 is an end elevation view of an assembled pair of split insulative washers used in the solenoid of the invention.

Split washer sets 36, 36' and 34, 34', are formed in half segments to facilitate assembly as illustrated in FIGS. 4, 4A and 4B. A face view of the assembled split washer set 36, 36' is shown in FIG. 4 and individually in FIGS. 4A and 4B. The split washer set 34, 34' differs from the split washer set 36, 36' in that the washers comprising the split washer set 36, 36' are configured respectively with washer inner notches 38, 38' and washer outer notches 40, 40' which notches are located to coincide with and perform the same respective function as the bobbin hole 24 and notch 26 of bobbin flange 22. Split washer set 34, 34' and split washer set 36, 36' have substantially the same inner and outer diameters as flanges 22, 22'. To preserve both mechanical and electrical integrity and protection, the inner and outer washers of each split washer set are assembled as best seen in FIG. 4 by offsetting the outer and inner split lines by an angle R. In the case of the notched split washer set 36, 36', it is necessary to coordinate the notches and the lines of split so that the notches 38, 38', 40, 40' do not occur on the split lines of the washers. During the assembly of the washers, any convenient means of attachment, such as adhesive or physical interlocking means may be employed to attach the split washer pieces. An acceptable high temperature resistant and thermally insulating material suitable for fabrication of the split washers 34, 34', 36, 36' is G-7 fiberglass/silicone sheeting supplied by N.V.F. Technical Products Division, Kennett Square, Pa.

After split washers 34, 34' are assembled to the inner surface of flange 22a and split notched washers 36, 36' are assembled to the inner surface of flange 22 with washer notches 38, 38', 40, 40' aligned with hole 24 and notch 26 of bobbin 28 (see FIG. 3), wire assembly and winding may proceed. In FIG. 3 it is seen that coil beginning lead 42 is threaded through the washer inner notches 38, 38' and bobbin inner hole 24. Coil 30 is wound in uniform sequential layers from core 20 to substantially the outer diameter of flanges 22, 22a. Coil ending lead 44 is then placed across washer outer notches 40, 40' and bobbin outer notch 26 to reside parallel to beginning lead 42. Similar to the other components utilized in the illustrative embodiment described, the wire used to wind coil 30 must be able to tolerate at least 200° C. An enamel insulated copper magnet wire product known as G-200 (Essex, Inc., Ft. Wayne, Ind.) has been found suitable for this application. Appropriate number of turns of wire, according to wire size, coil size, power ratings, etc. are wound onto bobbin 28 to form coil 30.

An outer film wrap 32 formed of a similar high temperature resistant, electrical insulation material as that used adjacent core 20 of coil 30 is applied to the outer periphery of coil 30, optionally with the application of an adhesive or other means of securement. All components thus being capable of tolerating at least 200° C., the solenoid 18a produced exceeds the thermal requirements of the operating system.

Tubular protective half-section bobbin casings 50, 52 as seen in FIG. 6, are placed in thermally conductive contact with the bobbin of each wound solenoid 18a and each solenoid and its casings 50, 52 are held in position by means of straps 54 (FIG. 1) which are anchored to the laser head by any secure method. The casing half-sections 50, 52 are preferably formed of aluminum sheet material and function to protect the inner components of solenoid 18a by conducting and radiating the generated heat outwardly, away from more thermally sensitive internal parts and in cooperation with the forced cooling air flow described above. After each of the solenoids has been completely assembled individually and secured in its respective position on the laser head or base, the laser tube 12 is passed through the solenoid assembly 18 and also secured in position. Leads 42, 44 of each solenoid forming part of the solenoid assembly 18 are appropriately connected to obtain the desired operation and may be connected in series, in parallel or in a combination series-parallel configuration dependent on the type gas laser with which the solenoid assembly 18 is to be employed.

To further enhance the overall laser operation, it is preferred that laser tube 12 be a single piece laser tube as illustrated in FIG. 7, in contrast to using a laser tube made up of segments as shown, for example, in U.S. Pat. Nos. 4,380,077 or 4,553,241. The single piece design improves bore alignment and eliminates internal joint protrusions. More specifically, is preferred that laser tube 12 have a precisely ultrasonically drilled bore 64 in a tube 12 made of an appropriate electrically insulating ceramic material. Tube 12 also has a plurality of relatively small size gas return holes 66, which do not require use of wire inhibitors, such as shown in FIG. 8. To reinforce the edge of laser tube 12, protective band 62 is added at each end thereof. Thus, longer laser life is achieved both by reason of the improved solenoid and cooling system of the invention as well as by the association of such a system with the longer tube life achievable with a single piece tube 12 as contrasted to the shorter tube life associated with the conventional segmented type laser tube.

By the apparatus described above, the objective of achieving improved cooling and improved thermal tolerance in an excitation solenoid has been achieved. The principles described in the preferred embodiment are offered as examples and not to be considered as limitations on the scope of the invention, which are defined by the claims which follow.

What is claimed is:

1. In a laser having a laser tube and a concentrically mounted solenoid capable of withstanding elevated temperatures, said solenoid comprising;

(a) a wire receiving bobbin having a hollow, cylindrical core and a pair of opposed parallel flanges formed integral with the core and located at opposite ends thereof and made of a rigid heat conductive material;

(b) an inner high temperature resistant, electrically and thermally insulating film wrapped around said core of said bobbin;

(c) high temperature resistant electrically and thermally insulating means mounted adjacent to each flange and between said pair of flanges of said bobbin;

(d) a length of wire coiled circumferentially around said bobbin core upon said insulating film and having a beginning lead and an ending lead; and (e) an outer high temperature resistant, electrically and thermally insulating film wrapped around said wound length of wire.

2. A laser solenoid as claimed in claim 1, further comprising a physically protective and thermally conductive tubular outer casing mounted in intimate heat conducting contact onto said bobbin and formed of a heat conductive material.

3. A laser solenoid as claimed in claim 1, including an opening formed in a selected one of said flanges adjacent said core and a notch formed in said selected flange at the periphery thereof for receiving said beginning and ending leads.

4. A laser solenoid as claimed in claim 1, including a first notch opening formed through a selected one of said insulating means on an outer periphery thereof and a second notch opening formed on an inner periphery thereof adapted and assembled to said bobbin so that said notches in said insulating means align with said opening and notch in said bobbin flange.

5. A laser having a laser tube and a solenoid in combination with laser air cooling means and mounted within a laser housing, comprising:

(a) a laser tube;

(b) a solenoid mounted concentrically around said laser tube, comprising:

(i) a wire receiving bobbin having a hollow, cylindrical core and a pair of opposed parallel flanges formed integral with the core and located at opposite ends thereof and made of a rigid heat conductive material;

(ii) an inner high temperature resistant, electrically and thermally insulating film wrapped around said core of said bobbin;

(iii) high temperature resistant electrically and thermally insulating means mounted adjacent to each flange and between said pair of flanges of said bobbin;

(iv) a length of wire coiled circumferentially around said bobbin core upon said insulating film and having a beginning lead and an ending lead;

(v) an outer high temperature resistant, electrically and thermally insulating film wrapped around said wound length of wire;

(vi) the inner diameter of said hollow cylindrical core of said bobbin configured to be substantially larger than a laser tube to be passed therethrough so as to create an air channel between said laser tube and said bobbin core;

(c) laser air cooling means, comprising:

(i) input ventilator means mounted in fluid communication with and operative to drive cooling air into said laser housing;

(ii) air duct means configured to allow air to pass therethrough and connected at a proximal end to said air channel; and (iii) suction fan means mounted on a distal end of said air duct means and operative to draw cooling air through said solenoid.

6. A laser as claimed in claim 5, wherein said laser tube comprises a single piece laser tube having a precision formed 7. A laser as claimed in claim 5, wherein said air duct means is connected intermediate a pair of said solenoids.

8. A laser as claimed in claim 7, wherein said input ventilator and said suction fan each comprise electrically operative fans mounted to function in cooperative air flow directions.

* * * * *

UNITED STATES PATENT AND TRADEMARK OFFICE
CERTIFICATE OF CORRECTION

PATENT NO. : 5,253,261
DATED     : October 12, 1993
INVENTOR(S) : Edwin G. Chaffee It is certified that error appears in the above-identified patent and that said Letters Patent is hereby corrected as shown below:

Column 8, line 2, complete the sentence with "bore."

Signed and Sealed this

Twenty-ninth Day of March, 1994

Attest:

BRUCE LEHMAN

*Attesting Officer*   *Commissioner of Patents and Trademarks*